United States Patent

[11] 3,619,667

[72] Inventor Albrecht Gerlach
Emmendingen, Germany
[21] Appl. No. 23,644
[22] Filed Mar. 30, 1970
[45] Patented Nov. 9, 1971
[73] Assignee International Telephone and Telegraph Corporation
Nutley, N.J.
[32] Priority Apr. 17, 1969
[33] Germany
[31] P 19 19 540.5

[54] BISTABLE MULTIVIBRATOR
3 Claims, 1 Drawing Fig.

[52] U.S. Cl. .......... 307/291, 307/287, 307/289, 307/324
[51] Int. Cl. .......... H03k 3/26
[50] Field of Search .......... 307/279, 287, 289, 291, 293, 247, 292, 324; 328/206; 331/113 R

[56] References Cited
UNITED STATES PATENTS

| | | | |
|---|---|---|---|
| 3,482,187 | 12/1969 | Sassler | 307/287 X |
| 2,831,986 | 4/1958 | Sumner | 307/291 X |

*Primary Examiner*—Stanley D. Miller, Jr.
*Attorneys*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

ABSTRACT: A bistable multivibrator in which the base of first and second transistors are coupled to the collectors of said second and first transistors respectively. One terminal of first and second elements exhibiting thyratron characteristics are coupled to the base of the respective first and second transistors. The other terminal of said first and second elements are coupled to a control voltage.

PATENTED NOV 9 1971
3,619,667
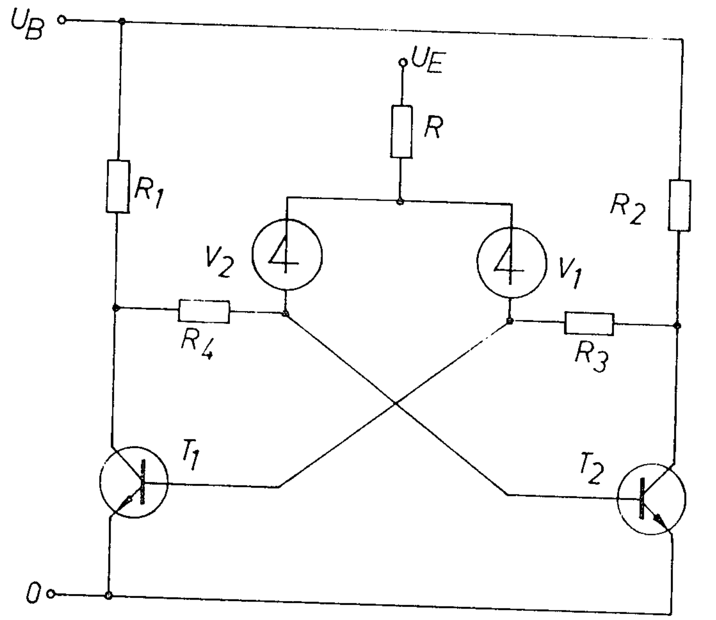
INVENTOR
ALBRECHT GERLACH
BY Stephen A Young
ATTORNEY

BISTABLE MULTIVIBRATOR

BACKGROUND OF THE INVENTION

This invention relates to a bistable multivibrator with two transistors in which the base of one transistor is conductively coupled to the collector of the other transistor.

When a multivibrator is to be used as a frequency divider stage, it is necessary that the multivibrator changes its circuit condition in response to an input pulse, i.e. the conducting transistor becomes nonconducting when the nonconducting transistor becomes conducting. In all known multivibrators, a storage element is required which stores the initial state of the multivibrator and insures that the end state is opposite to the initial state. This storage function is performed using networks of capacitors or sometimes inductors.

However, if such a bistable multivibrator is made using monolithic integrated solid state circuit techniques the inclusion of inductors and capacitors is very difficult. Therefore, methods have been sought to obtain the described storage effect using circuits which contain no reactive components. One known circuit for attaining this objective consists, for example, in again using a flip-flop as temporary storage, which flip-flop is largely similar to the one to be switched over. This is known as the master-slave principle. With this principle, a relatively great number of elements per flip-flop is required.

In another known circuit, the storage device consists of a circuit having a mode of operation essentially identical with the master-slave principle. Upon the introduction of a controlling pulse, the master is set into the new operating condition, and this condition is later transferred to the slave. Therefore, this circuit is also very complicated.

SUMMARY OF THE INVENTION

It is an object of the present invention to provide a flip-flop which does not include a reactive storage device and has considerably less elements than circuits that rely on the master-slave principle.

According to a broad aspect of the invention there is provided a bistable multivibrator having two transistors, the base of each transistor being conductively coupled to the collector of the other respective transistor, comprising a first and second element having a thyratron characteristic, one terminal of said first and second elements being coupled to the base of said first and second transistors respectively, and means for coupling the other terminal of each element to a control voltage.

BRIEF DESCRIPTION OF THE DRAWING

The drawing shows an embodiment of the invention.

DESCRIPTION OF THE PREFERRED EMBODIMENTS

In describing the present invention in detail, reference will be made to the accompanying drawing. As already known, the flip-flop comprises two transistors $T_1$, $T_2$ with associated collector resistors $R_1$ and $R_2$, and two base series resistors, the base series resistor $R_3$ of transistor $T_1$ being connected to the collector of transistor $T_2$ and the base series resistor $R_4$ of transistor $T_2$ being connected to the collector of transistor $T_1$.

According to the invention, elements $V_1$ and $V_2$ having a thyratron characteristic, e.g. a four layer PNPN diode or a PNP-NPN transistor combination, are connected to the base of each of the two transistors respectively. The other terminal of each of these two elements is coupled to the control (input signal) voltage $U_3$ via a common series resistor R. The two elements illustrated in the drawing as four layer diodes have the same electrical characteristics and specifically, the same firing voltage. The bistable multivibrator is set to switch into its other operating condition when the peak value of the control voltage $U_E$ exceeds the firing voltage. Power is supplied to the circuit by voltage source $U_B$.

In order to explain the mode of operation it is assumed that the transistor $T_1$ is in the saturated conducting state and, consequently, transistor $T_2$ is cut off. At the beginning, the control voltage $U_E$ is zero or slightly positive. If the control voltage becomes more positive, the voltage across element $V_2$ will always exceed the voltage across element $V_1$ by the amount of the emitter base threshold voltage minus the saturation voltage of transistor $T_1$. Therefore, as the control voltage $U_E$ increases, the element $V_2$ fires at a certain instant and a base current will flow into transistor $T_2$ which base current switches the flip-flop over. Firing of $V_1$ is no longer possible after the firing of $V_2$, because a voltage drop occurs across the common resistor R which prevents $V_1$ from reaching its firing voltage.

From the above description it is seen that in the circuit according to the invention, a firing signal is derived from an element having a thyratron characteristic and from the potentials existing within the flip-flop which firing a signal directly switches over the flip-flop. This mode of operation makes possible a relatively simple design and, consequently, results in a saving of elements.

A frequency divider chain can be formed if several circuits according to the invention are connected in series, the collector voltage of a transistor of the preceding stage serving as the control voltage for the subsequent stage.

It is to be understood that the foregoing description of specific examples of this invention is made by way of example only and is not to be considered as a limitation on its scope.

What is claimed is:

1. A bistable multivibrator having a first and second transistor, each of said transistors having an emitter, base and collector, the base of said first transistor being coupled to the collector of said second transistor, and the base of said second transistor being coupled to the collector of said first transistor, the emitter of said first transistor being coupled to the emitter of said second transistor, comprising:
   first and second elements having thyratron characteristics; one terminal of said first and second elements being coupled to the base of said first and second transistors respectively; and
   means for coupling the other terminal of said first and second elements to a control voltage.

2. A bistable multivibrator according to claim 1 wherein said coupling means includes a resistor interposed between said control voltage and the other terminal of said first and second elements.

3. A bistable multivibrator according to claim 1 wherein said first and second elements are four layers PNPN diodes.

* * * * *